Sept. 4, 1928.
D. F. FESLER
FILTER ELEMENT
Filed July 19, 1923
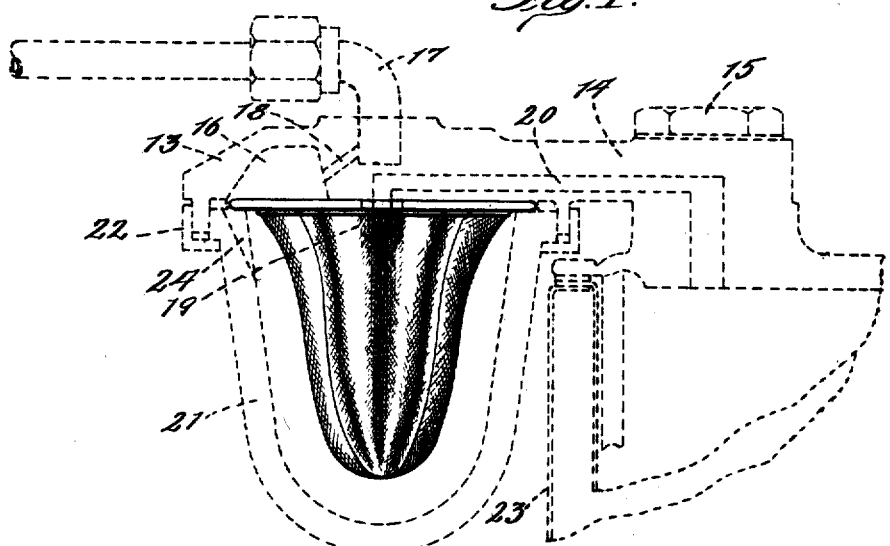
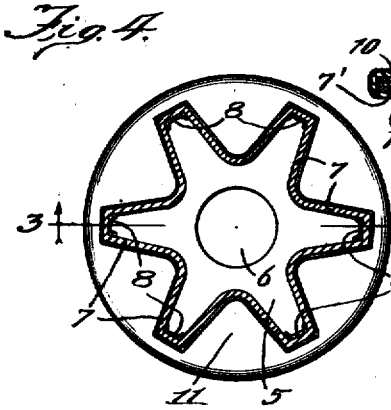
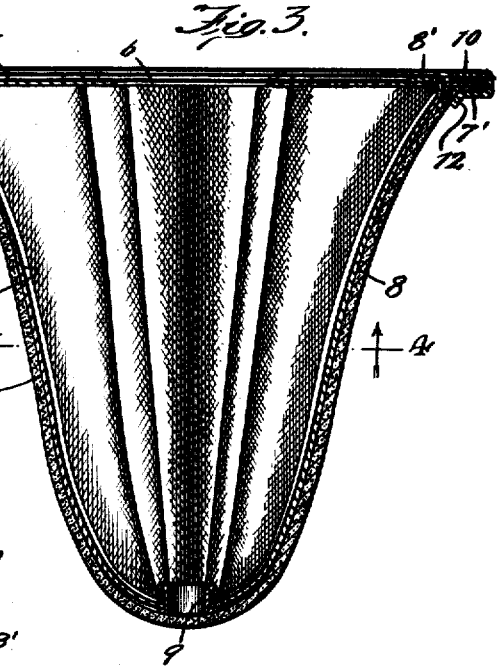
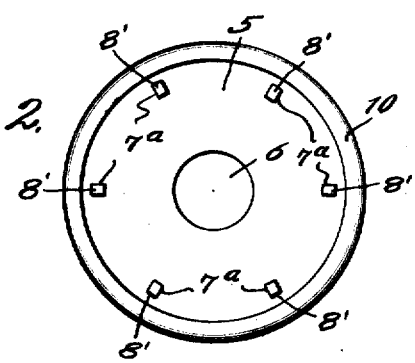
Inventor:
Douglas F. Fesler Patented Sept. 4, 1928.

UNITED STATES PATENT OFFICE.

DOUGLAS F. FESLER, OF CHICAGO, ILLINOIS, ASSIGNOR TO THE BASSICK MANUFACTURING COMPANY, OF CHICAGO, ILLINOIS, A CORPORATION OF DELAWARE.

FILTER ELEMENT.

Application filed July 19, 1923. Serial No. 652,628.

My invention relates to filter elements, and is particularly concerned, though not limited, with the provision of a novel filter element to be used in a filter for filtering gasoline.

The objects of my invention are to provide a filter element which is simple in construction, economical to manufacture, and which affords a large filter surface.

Another object of my invention is to provide a filter element of the type described, which can be easily inserted and removed from the filter in which it is used.

Other objects of my invention will appear as this description progresses, reference being had to the accompanying drawings in which Figure 1 is a side elevation of my improved filter element which is shown in place in a suitable filter illustrated in dotted outline.

Figure 2 is a plan of my improved filter element.

Figure 3 is a vertical central section taken on line 3—3 of Figure 4, and

Figure 4 is a transverse section taken on line 4—4 of Figure 3.

Throughout the several views similar reference characters will be used for referring to similar parts.

My improved filter element comprises a disc 5 which may be made of any suitable material. This disc is provided with a central opening 6 and with a series of spaced openings 7ª located adjacent the edge thereof.

For supporting the filter bag 7, I provide a plurality of bow elements 8, which are here shown as being formed of metal strips which are convexed outwardly, as shown in Figure 4. Each of these bows has its ends secured in a pair of oppositely disposed openings 7ª and turned over as shown at 8' into contact with the outer face of the disc 5, thereby securing each of the bows in position. At the points where the bows 8 cross, they are secured together by means of a suitable tubular rivet 9 or in any other desired manner.

The edge 7' of the filter bag 7 passes around the edge of the disc 5 and is secured in place by a substantially annular shaped retaining member 10, which clamps the edge of the filter bag to both sides of the disc 5. The retaining member 10 is provided with a plurality of spaced re-entrant portions 11, which project between adjacent bows 8 and thus form a plurality of folds in the filter bag, extending from the disc substantially to the lower end of the filter element. A flange 12 is formed on the retaining member to contact with the filter bag, so as to prevent abrasion of the filter bag at points of contact between it and the retaining member.

The filter element described above is particularly adapted to be used as a part of the filter described in my co-pending application, Serial No. 572,711 filed July 3, 1922. Briefly speaking, this filter comprises the cap portion 13, which is provided with a lateral extension 14, adapted to be secured to the intake of a vacuum tank by means of a screw 15. The cap 13 is provided with a substantially annular chamber 16, with which the intake pipe 17 from a suitable source of fuel communicates through the passageway 18. A substantially centrally located boss 19 projects through the opening 6 in the filter element, and is provided with a passageway 20 which discharges into the vacuum tank. A bowl 21 of glass or other suitable material is secured to the cap 13 by means of the clamping ring 22.

In operation, when the suction is produced in the vacuum tank 23, the fuel passes through the pipe 17 and passageway 18 into the annular chamber 16, and from thence around the edge of the upper end of the filter element and the flutings 24 into the bowl 21. From the bowl 21, the fuel passes through the filter bag 7, which is preferably made of chamois, and out through the passageway 20 into the vacuum tank.

The filter element which I have described above, is simple in construction, economical to manufacture, and affords a very large filter surface. Chamois has the property of repelling or straining water from gasoline. The water and dirt thus separated from the gasoline collects in the bottom of the bowl 21, which can be removed from time to time for the purpose of emptying the water and sediment therefrom.

While I have described the details of construction of the preferred embodiment of my invention, it is to be clearly understood that my invention is not limited to these details of construction, but is capable of

Having thus described my invention, what I claim is:

1. A filter element comprising a disc having a central opening and a plurality of spaced openings extending therethrough adjacent its edge, a plurality of spring bow elements, each having its free ends secured in an oppositely disposed pair of said openings, means for securing together the central portions of said bow elements, a chamois bag supported by said bow elements and having its edge extending around the outer edge of said disc, and a retaining member having an opening for receiving said chamois bag, the edge of said opening having spaced re-entrant portions projecting between adjacent bow elements for forming folds in said chamois bag, the outer edge of said retaining member being folded upon said disc for securely clamping the edge of said chamois bag to said disc.

2. A filter element comprising a disc having a central opening and a plurality of spaced openings extending therethrough adjacent its edge, a plurality of spring bow elements, each having its free ends secured in an oppositely disposed pair of said openings, a filter bag supported by said bow elements and having its edge extending around the outer edge of said disc, and a retaining member having an opening for receiving said filter bag, the edge of said opening having spaced re-entrant portions projecting between adjacent bow elements for forming folds in said filter bag, the outer edge of said retaining member being folded upon said disc for securely clamping the edge of said filter bag to said disc.

3. A filter element comprising a disc having a plurality of spaced openings extending therethrough adjacent its edge, a plurality of spring bow elements, each having its free ends secured in an oppositely disposed pair of said openings, a filter bag supported by said bow elements and having its edge extending around the outer edge of said disc, and a retaining member having an opening for receiving said filter bag, the edge of said opening having spaced re-entrant portions projecting between adjacent bow elements for forming folds in said filter bag.

4. A filter element comprising a disc having a plurality of spaced openings extending therethrough adjacent its edge, a plurality of spring bow elements, each having its free ends secured in a pair of said openings, a filter bag supported by said bow elements and having its edge extending around the outer edge of said disc, and a retaining member having an opening for receiving said filter bag, the edge of said opening having spaced re-entrant portions projecting between adjacent bow elements for forming folds in said filter bag.

5. A filter element comprising a circular disc, a filter bag having its edge extending around the edge of said disc, and a retaining member bent around the edge of said disc and clamping said filter bag to said disc, said retaining member comprising means for determining modulations in said filter bag.

6. A filter element comprising a disc, a filter bag having its edge extending around the edge of said disc, a retaining member bent around the edge of said disc and clamping said filter bag to said disc, said retaining member having spaced inwardly projecting portions to form vertical flutes in said bag, and means inside said bag for forcing the bag outwardly at points intermediate said inwardly projecting portions.

In witness whereof, I hereunto subscribe my name this 11th day of July, 1923.

DOUGLAS F. FESLER.

CERTIFICATE OF CORRECTION.

Patent No. 1,682,897.          Granted September 4, 1928, to

DOUGLAS F. FESLER.

It is hereby certified that error appears in the printed specification of the above numbered patent requiring correction as follows: Page 2, line 73, claim 5, for the word "modulations" read "undulations"; and that the said Letters Patent should be read with this correction therein that the same may conform to the record of the case in the Patent Office.

Signed and sealed this 20th day of November, A. D. 1928.

M. J. Moore,
Acting Commissioner of Patents.

(Seal)

other adaptations and modifications within the scope of the appended claims.

Having thus described my invention, what I claim is:

1. A filter element comprising a disc having a central opening and a plurality of spaced openings extending therethrough adjacent its edge, a plurality of spring bow elements, each having its free ends secured in an oppositely disposed pair of said openings, means for securing together the central portions of said bow elements, a chamois bag supported by said bow elements and having its edge extending around the outer edge of said disc, and a retaining member having an opening for receiving said chamois bag, the edge of said opening having spaced re-entrant portions projecting between adjacent bow elements for forming folds in said chamois bag, the outer edge of said retaining member being folded upon said disc for securely clamping the edge of said chamois bag to said disc.

2. A filter element comprising a disc having a central opening and a plurality of spaced openings extending therethrough adjacent its edge, a plurality of spring bow elements, each having its free ends secured in an oppositely disposed pair of said openings, a filter bag supported by said bow elements and having its edge extending around the outer edge of said disc, and a retaining member having an opening for receiving said filter bag, the edge of said opening having spaced re-entrant portions projecting between adjacent bow elements for forming folds in said filter bag, the outer edge of said retaining member being folded upon said disc for securely clamping the edge of said filter bag to said disc.

3. A filter element comprising a disc having a plurality of spaced openings extending therethrough adjacent its edge, a plurality of spring bow elements, each having its free ends secured in an oppositely disposed pair of said openings, a filter bag supported by said bow elements and having its edge extending around the outer edge of said disc, and a retaining member having an opening for receiving said filter bag, the edge of said opening having spaced re-entrant portions projecting between adjacent bow elements for forming folds in said filter bag.

4. A filter element comprising a disc having a plurality of spaced openings extending therethrough adjacent its edge, a plurality of spring bow elements, each having its free ends secured in a pair of said openings, a filter bag supported by said bow elements and having its edge extending around the outer edge of said disc, and a retaining member having an opening for receiving said filter bag, the edge of said opening having spaced re-entrant portions projecting between adjacent bow elements for forming folds in said filter bag.

5. A filter element comprising a circular disc, a filter bag having its edge extending around the edge of said disc, and a retaining member bent around the edge of said disc and clamping said filter bag to said disc, said retaining member comprising means for determining modulations in said filter bag.

6. A filter element comprising a disc, a filter bag having its edge extending around the edge of said disc, a retaining member bent around the edge of said disc and clamping said filter bag to said disc, said retaining member having spaced inwardly projecting portions to form vertical flutes in said bag, and means inside said bag for forcing the bag outwardly at points intermediate said inwardly projecting portions.

In witness whereof, I hereunto subscribe my name this 11th day of July, 1923.

DOUGLAS F. FESLER.

CERTIFICATE OF CORRECTION.

Patent No. 1,682,897.  Granted September 4, 1928, to

DOUGLAS F. FESLER.

It is hereby certified that error appears in the printed specification of the above numbered patent requiring correction as follows: Page 2, line 73, claim 5, for the word "modulations" read "undulations"; and that the said Letters Patent should be read with this correction therein that the same may conform to the record of the case in the Patent Office.

Signed and sealed this 20th day of November, A. D. 1928.

M. J. Moore,
Acting Commissioner of Patents.

(Seal)